Sept. 25, 1934.     H. T. BURKEY     1,974,444
METHOD OF AND APPARATUS FOR ELECTRICALLY DIVERTING FISH
Filed June 12, 1929     3 Sheets-Sheet 1

INVENTOR
H. T. BURKEY
BY Hazard and Miller
ATTORNEYS

Sept. 25, 1934.   H. T. BURKEY   1,974,444
METHOD OF AND APPARATUS FOR ELECTRICALLY DIVERTING FISH
Filed June 12, 1929   3 Sheets-Sheet 2
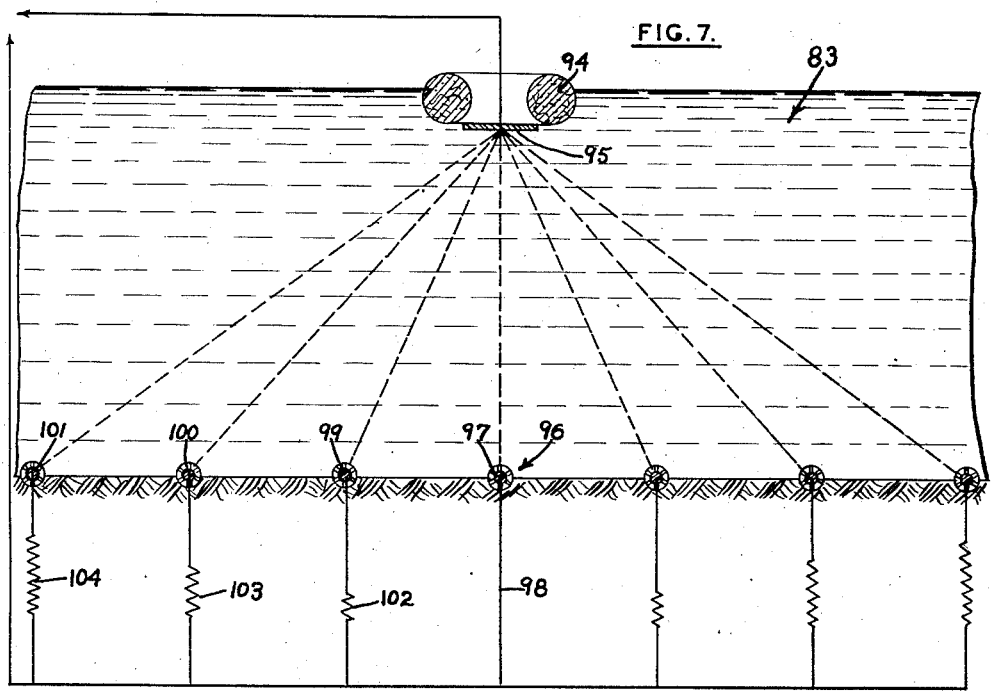
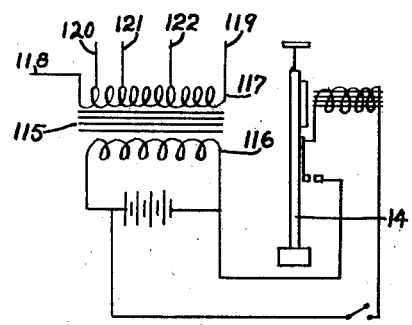
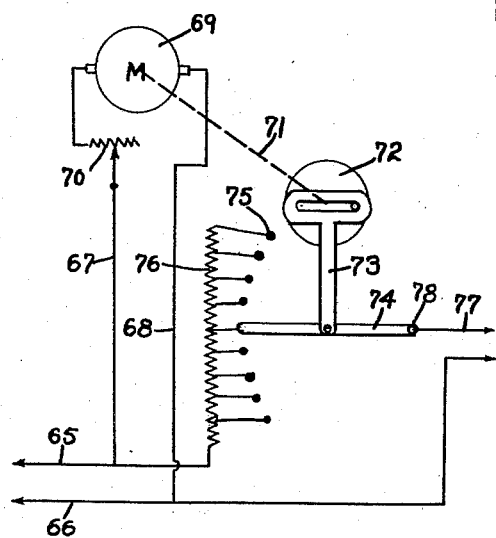
INVENTOR
H. T. BURKEY
BY Hazard and Miller
ATTORNEYS Sept. 25, 1934.  H. T. BURKEY  1,974,444
METHOD OF AND APPARATUS FOR ELECTRICALLY DIVERTING FISH
Filed June 12, 1929  3 Sheets-Sheet 3
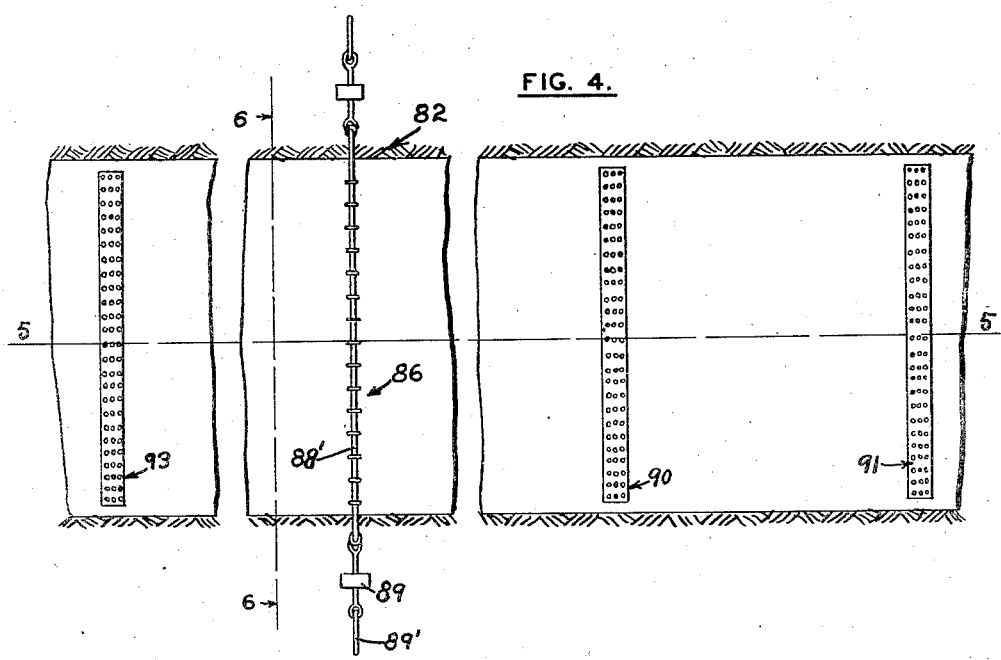
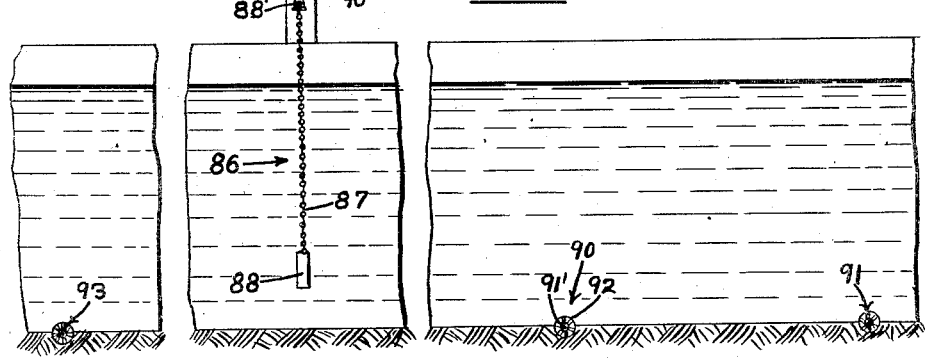
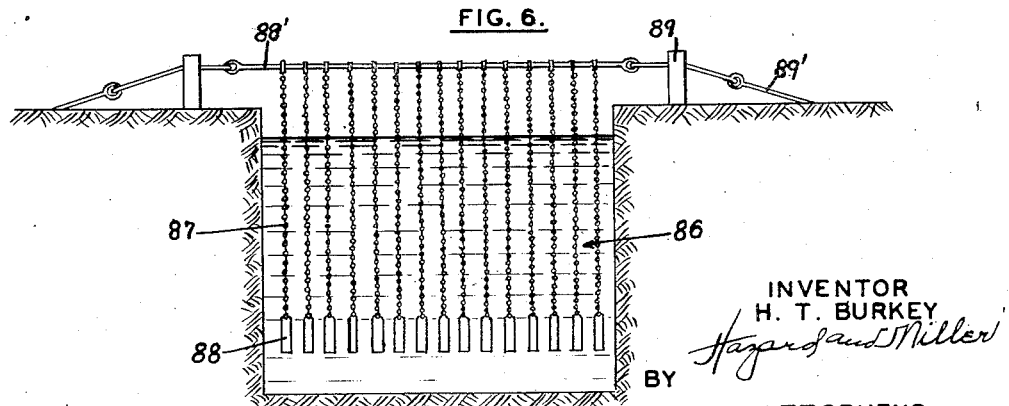
INVENTOR
H. T. BURKEY
BY Hazard and Miller
ATTORNEYS Patented Sept. 25, 1934

1,974,444

UNITED STATES PATENT OFFICE 1,974,444

METHOD OF AND APPARATUS FOR ELECTRICALLY DIVERTING FISH

Henry T. Burkey, Montrose, Calif., assignor, by mesne assignments, to Burkey Manufacturing Company, a copartnership composed of H. T. Burkey and O. Q. Beckworth, Los Angeles, Calif.

Application June 12, 1929, Serial No. 370,189

30 Claims. (Cl. 175—311)

My invention is a method and apparatus for electrically diverting fish.

My invention relates principally to fish conservation and is an approved method for preventing fish and other aquatic animals from entering irrigation ditches, water flumes, other streams both natural and artificial, tail races and intakes to power and pumping plants and the like, where they might be destroyed. Also my invention relates to preventing the passage of fish to and fro between ponds or other bodies or compartments of water where they may be confined or kept separated according to size or other differentiations as in fish hatcheries, fish farms, other breeding places and the like, and for such other diversions from their directional course of travel as may be necessary or desired.

I have ascertained that fish may be successfully diverted from their directional course of travel without injury, by so electrifying a zone of water through which they desire to pass, that they will upon entering said zone receive a series of electric shocks of such nature and so delivered as to stop or divert them from their course without injury and my improved method for producing the same as set forth herein.

I have further found that when fish enter an electrified zone of water and are subjected to a continuous flow of electric current of high frequency, a state of physiological "tetanus" is set up in the muscles of the fish, which, if of sufficient severity and long enough duration, produces complete loss of voluntary motion which is paralysis, and sometimes of such severity as to preclude the possibility of recovery. "Tetanus" is physiologically described as that condition of a muscle in which it is in a state of persistent, continuous contraction, as when stimulated by a series of inductance shocks.

I have also ascertained that when fish enter an electrified zone of water energized with an uninterrupted flow of electric current of such high frequency and of sufficiently high voltage as to effectively stop or divert them, this state of "tetanus" is often set up of such severity as to quickly cause paralysis and sometimes death. It is evident that the longer time a fish is subjected to the influence of such current without relaxation, the more profound becomes the state of paralysis, which precludes the possibility of voluntarily moving out of the electrified zone or field.

I have also found (and this is a very important feature of my improved method) that when such zone of water is electrically energized with a current of electricity in which the flow of current is so interrupted or broken as to intermittently project through said zone of water, sudden pulsations or beats of electric current successively followed by periods of intermission of current, a sufficiently high voltage can be used as is necessary to stop or divert from their directional course of travel, fish of all sizes without danger of paralysis or any injury to them whatsoever, the frequency of the interruptions to be in inverse ratio to the voltage, that is, the higher the voltage the slower the interruptions and vice versa.

In the performance of my improved method it is understood that in the electrifying of the zone of water, the electric currents should be of the required voltage and amperage to produce enough electric current density in the water as to give sufficient electric shock to the fish to cause their diversion.

I have further ascertained that it is desirable to so control the interruptions of current that the period of time in which the current is "off" is, comparatively speaking, considerably longer than that in which the period is on, thus producing comparatively quick short jolts of current followed by longer periods of "off" or no flow of current, allowing successive intermittent relaxations of muscular contraction between the comparatively shorter stabs of electric current. This spasmodic contraction of the muscles followed by periods of relaxation is known as "tetany" and is physiologically described as an intermittent vibratory contraction of the muscles and in this intermittency, that is periods of contraction followed by periods of relaxation, consists its differentiation from "tetanus". This intermittency very much reduces the severity and cumulative effect, and especially so when, as preferably used in my method, the periods of intermission are comparatively so much greater than the periods of current flow, the cumulative effect is so reduced as to preclude the possibility of paralysis. Thus the fish retain their power of voluntary motion which enables them to safely avoid or leave the electrically charged field and also prevents them from becoming confused and thereby losing their sense of direction.

While in my method I much prefer the complete intermittent break of the current, a similar effect as described could be obtained by the use of a pulsating current in which the voltage would gradually increase to the maximum and successively decrease to the minimum, but never be entirely interrupted or broken, such action as could be accomplished by a properly manipulated rheostat, In the operation of my method, either A. C. or D. C. current may be used for electrically energizing the water of the zone, providing it is interrupted or broken up as set forth herein. The source of electric current may be either an electric generator of the usual type, batteries or the ordinary commercial light or power line of 50 or 60 cycle.

I prefer, when it is possible, to so establish and energize the electrified zone of water that electric currents will travel through the zone in a direction in line with the flow of the water through the zone so that as the fish enter the zone these currents will pass longitudinally through their bodies. Fish often approach and enter the electrified zone in schools or bodies and it is desirable that the zone be of sufficient area and breadth as to prevent too much interference and consequent confusion of the fish in their maneuvering out from the electrically charged zone.

In order to secure such sufficient area and breadth, as well as to cause the electric currents to flow through the zone in a direction in line with the flow of the water, I prefer to establish this zone by means of at least two electrodes so spaced apart in the water as to establish a zone of water of sufficient width (preferably 6 to 10 feet). One of these electrodes I suspend in the water and the other, sufficiently spaced therefrom, I submerge and cause to be grounded by being contacted with the bed or ground surrounding the water, thus causing the electric currents to flow through the zone from suspended electrode to grounded electrode and in line with the flow of the water through the zone. With this arrangement of electrodes the ground immediately surrounding the electrified zone, gradually absorbs some of the electrical energy as it flows through the zone, which absorption gradually decreases the electrical intensity thereof towards the side of the zone bounded by the grounded electrode and, as the fish enter the zone from this side, the farther they enter therein the more intense the electrical density. Thus the distance the fish penetrate into the zone before being diverted is determined by their size or length which differentiates their susceptibility to the effects of the electric currents. This graduated zone may also be established by a series of submerged electrodes which are connected with the electric current line by means of graduated resistance through which the current passes.

While in establishing such electrified zone I preferably use two electrodes as described, additional grounded or submerged electrodes may be used to further graduate the flow of the electric currents if it is so desired. In the performance of my improved method, it is understood that, in the electrifying of the zone of water the electric currents should be of the required voltage and amperage to produce enough electric current density in the water as to give sufficient electric shock to the fish to cause their diversion and in highly mineralized waters, such as salt water, a greater electric current density is required than in waters of lower or no mineral content.

In order that fish may not come in direct contact with the bare electrodes, I find it desirable to cover same with a non-conducting material either of a porous nature or so perforated as to not interfere with free electrical contact with the water.

My invention is illustrated in connection with the accompanying drawings, in which, Figure 1 is a diagram showing a pendulum type of current interrupter and wiring suitable for one form of application of my invention;

Figure 2 is a diagram showing suitable wiring for my invention utilizing a pulsating current;

Fig. 4 is a plan showing one manner of installing the electrodes in a stream, flume or the like;

Fig. 5 is a vertical section on the line 5—5 of Fig. 4 in the direction of the arrows;

Fig. 6 is a vertical transverse section on the line 6—6 of Fig. 4 in the direction of the arrows;

Fig. 7 is a vertical sectional modification of my invention, showing the use of an electrode floated by a boom or raft.

Fig. 8 is a diagram showing a transformer system of obtaining output currents of different voltages.

Figure 1:
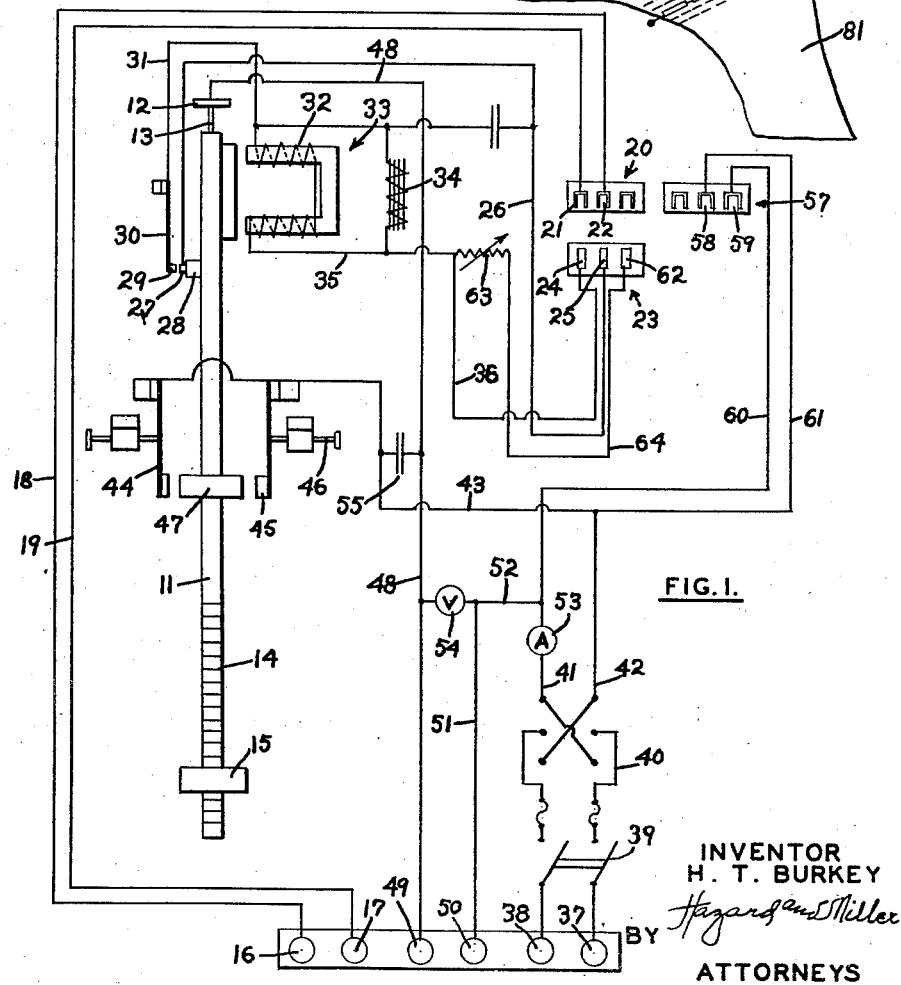

Referring first to the diagram of Fig. 1, a pendulum 11 is illustrated as being mounted on a supporting block 12 with a spring 13 connecting the pendulum and the block. The pendulum has graduations 14 and an adjustable weight 15 thereon to give the desired period of operation. This may be mounted on a suitable panel or the like. A connection for operating the vibrator by means of a battery is indicated as having terminals 16 and 17 connected by lead wires 18 and 19 to the jack 20 which has the sockets 21 and 22. This jack forms a connection with a plug 23 which has the contacts 24 and 25. The contact 25 has the lead wire 26 which extends to a contact 27 mounted on an insulating base 28 on the pendulum 11. This contact in the swinging of the pendulum engages a movable contact 29 attached to a spring 30 the spring having the lead wire 31 which is brought to the winding 32 of a magnet 33 and has a by-pass to an inductance 34.

The coil and inductance are connected by the wire 35 and the wire 36 leads to the contact 24; thus making a circuit between the two battery terminals 16 and 17. This causes a vibration of the pendulum and the period of vibration may be regulated by the strength of the current and the position of the weight on the pendulum. The use of the battery is intended for conditions in which a source of power supply as an outside supply, cannot be readily obtained or such outside supply is inoperative.

The power circuit comprises the terminals 37 and 38 one of which when using direct current will be positive and the other negative. A main switch 39 is connected in the leads from the terminals as is also a reversing switch 40. The current passes to and from the terminals 37 and 38 by the lead wires 41 and 42, current from the wire 42 being illustrated as passing by the lead 43 to two springs 44 which are mounted on fixed supports. Each of these springs has a contact 45 and such springs are adjusted by adjusting screws 46. The vibration of the pendulum brings the conducting block 47 into engagement with the contacts 45 the current then passing upwardly through the vibrating pendulum to the lead 48 which comes to the terminal 49 carrying the output from the interrupter to one of the electrodes or to a series of electrodes. The return is indicated by the terminals 50, the lead wires 51 and 52 to the wire 41 and hence connecting with the source of supply at 37 and 38.

An ammeter 53 is illustrated in the wire 41 and the volt 54 connecting the lines 48 and 51. This gives an interrupted circuit to the terminals, there being an impulse of current each time the block 47 engages the contacts 45 with the interruptions while the pendulum swings between the contacts. A type of contact is a more or less wiping contact due to the action of the springs 44 and hence to a great extent preventing sparking and the condensers 55 aid in preventing a sparking at the contacts.

Where it is desired to operate the oscillation of the pendulum by the main source of supply, which is the usual practice, a second jack 57 is utilized. This has sockets 58 and 59 connected by lead wires 60 and 61 to the leads 41 and 42 and hence to the source of supply at 37 and 38. The contact 25 of the plug 23 engages with the socket 58 and the plug contact 62 engages with the socket 59. The current passing through the socket 58 and the plug 25 follows the line 26 to the contact 27 mounted on the insulating base 28 on the pendulum, this engaging with the contact 29 on the spring 30 and thence by a lead 31 through the windings 32 of the electro-magnet 33 and having a by-pass through the inductance 34. The lead 35 is connected to an adjustable resistance 63 and by the lead 64 back to the plug 60 hence the socket 59 of the jack 57 and thus by the lead wires 50 and 61, 41 and 42, back to the source of supply 37 and 38. By this connection the pendulum may be oscillated by the main source of supply and the power current for energizing the electrodes is by the circuit above described passing through the contacts 45 and 47, thereby charging the water with the electric current.

It is manifest that by the wiring shown in Fig. 1, a direct or alternating current may be utilized in the power circuit or electrodes for charging the water. With the pendulum circuit breaker of Fig. 1, and when using direct current it will be seen that the current is "on", thus electrifying the water zone for a much shorter period than the time the current is "off" and as the period of the vibrations of the pendulum may be regulated, this may be regulated to give a relatively low number of current chargings of the water with a sufficient period between to give the fish time to recover from the electrical jolt or shock. The relative length of time that the current is on and off may be regulated by shifting the springs 44 to make a longer contact between the contacts 45 and the conducting block 47. My arrangement takes care of the connections when it is desired to operate the pendulum from a battery and the power output from a power line or in which both are operated from power lines.

If alternating current is utilized I may still obtain the action having a complete cessation of the electrical charging of the water and with this alternating current of a fairly high frequency, the fish would be subjected to several oscillations of the current and then to a rest period of no current and the relative length of time of the charging of the water with the alternating current and of the no current charge can be readily regulated.

In Fig. 2 I illustrate in diagram, suitable mechanism for obtaining pulsations of a current which is never completely cut off but rises to a maximum and then drops to a minimum, there still being a small current passing through the water. In this illustration, supply lines are indicated by the numerals 65 and 66, having leads 67 and 68 to a motor 69 through an adjustable resistor 70. This motor by means of a shaft 71 is illustrated as driving a crank 72 which by means of the slotted cam rod 73 is operatively connected to a switch arm 74. This switch arm swings over the contacts 75 of a rheostat 76 and the output current is by the leads 77 through the switch end 78 connected to the lead 66.

It will be apparent by regulation of the speed of the motor and the shape of the slotted cam rod 73 that an electric wave having varied characteristics may be formed; that is, it may have a quick rise to the maximum, a quick drop or a slow rise and a slow drop, but in any case by this system of regulations, there is always, even at the minimum, a small electrical charging of the water. This arrangement may be used with either direct or alternating current.

Figure 3:
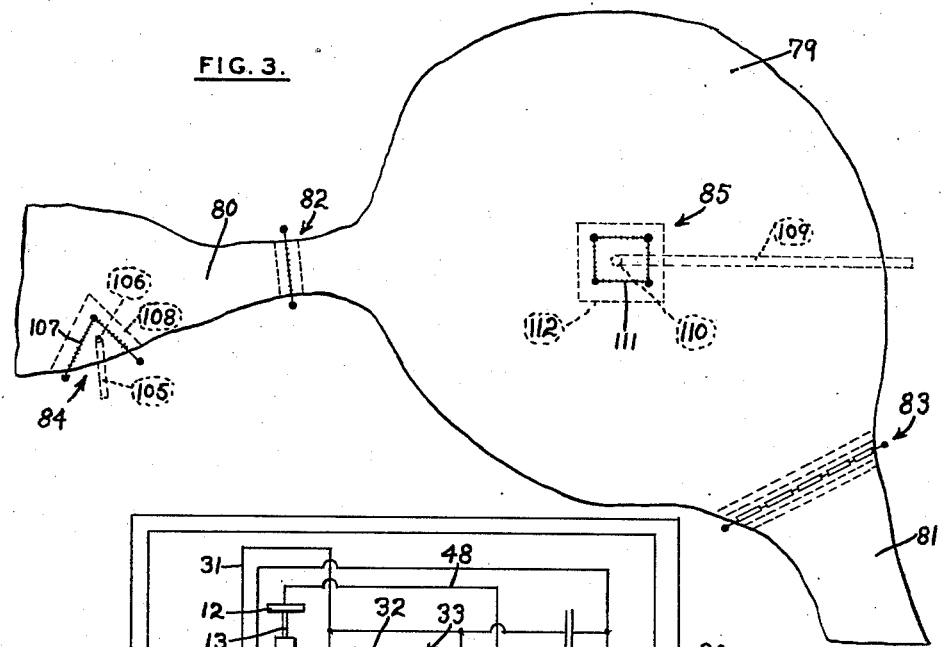
Fig. 3 is a plan illustrating a body of water with my fish diverters applied in several forms.

In Fig. 3 I illustrate various ways of utilizing my fish diverter. In this illustration a pond or lake is indicated by the numeral 79 in which it may be considered that there is either an inlet or outlet stream 80 and a body of water 81. A fish diverter 82 is shown in the stream to prevent passage of fish in both directions. There is another type of diverter 83 to prevent fish passing from the main body of the pond 79 to the body of water 81. A type of fish diverter from a lateral water supply such as a water supply siphon is indicated at 84. Another type of diverter 85 is shown to keep fish from entering a water outlet from a pond such as might be used for a water outlet in a reservoir.

The type of diverter designated by the numeral 82 is illustrated particularly in Figs. 4, 5 and 6. In this a screen 86 is formed of a series of chains 87, each having a weight 88 at the bottom and suspended from a cable 88. This cable is supported on posts 89 or the like, on opposite sides of the flume or stream and anchored to the ground as indicated by 89'. The cable 88' is electrically charged so that the chains and the screen form conducting elements. On one side of the screen there is illustrated a near and a remote electrode 90 and 91, each of these having a conducting cable or bar 91' with a perforated cover 92. The purpose of the cover is to prevent fish coming in direct contact with the conductor, but still allow the water to have direct action therewith.

On the other side of the screen there is another electrode 93. With this type of screen protection is given from the fish swimming from both directions. The electrodes on the bottom are connected to one side of the circuit and the chains of the screen to the other side of the circuit. Thus there is a current flow between the electrodes and the screen and the general flow of such current is in the direction or against the direction of the flow of water. Hence as fish usually swim either with or against a flowing current of water, the bodies of the fish are more or less aligned with the line of flow of the current. With the construction having two electrodes on one side of the screen, the charge of the water between the remote and the electrode on the bottom, will be less than between the nearest electrode and screen. Therefore the fish can gradually come into an electrified zone giving them an opportunity to turn and swim out of such zone.

In Fig. 7 I illustrate a type of diverter designated by the numeral 83 in Fig. 3. This shows a boom or raft 94 having a submerged electrode 95. There are a series of electrodes 96 arranged in the bottom, each preferably formed of a conducting bar or rod with an insulating cover having perforations. The illustration shows a central electrode 97 directly under the boom and in which there is substantially no resistance in the lead 98. The electrodes 99, 100 and 101 at different distances from the center electrode have increasing resistances in their leads designated 102, 103 and 104. When the electrodes on the bottom and the electrodes supported by the boom are energized, there will be a current flow between such electrodes. The electrode directly underneath the electrode 95 which has the least resistance in its circuit will carry the maximum load, whereas the electrode 101 which is most remote and has the largest resistance will carry the least current and the current will be graduated between the most remote and the center electrode. Thus the water is charged when the current flows with the current of varying density from the center to the two extreme electrodes in the bottom. Thus the fish swimming into this zone are first subjected to a rather mild electrical shock which gradually increases as the fish gets deeper into the zone, thus giving the fish an opportunity to swim out of the zone and be effectively diverted.

The diverter designated at 84 shows an outlet conduit or pipe 105 which has an intake end 106. This is protected by a chain-like screen 107 and an electrode 108 on the bottom. This is a type which is efficient and satisfactory for carrying water for irrigation or similar purposes. It has been found that screens on the pipe are unsatisfactory as they become clogged but the open pipe has given trouble in carrying too many fish on to the land where they become destroyed.

The diverter designated by the numeral 95 shows an outlet conduit or pipe 109 having an intake end 110 and is surrounded by a chain-like screen 111 and electrodes 112 on the bottom. This type prevents fish from swimming into the zone of the outlet and thus eliminates the factor of the fish being carried into the water supply; thus allowing an open ended pipe to be used.

An advantage of using the chain type of electrode is that it allows floating material to pass through the screen without clogging such screen and at the same time has a good electrical contact with the water. As the surface exposed to the water is so large, any fish touching any one of the chains are in no immediate danger of being electrocuted.

Owing to the varied physical conditions surrounding different installations, the voltage and amperage, in order to secure the most satisfactory and efficient results, will necessarily vary in accordance with the distance between electrodes, the width and depth of the stream, the volume and speed of the water etc. as well as the size of the fish to be diverted. I have found that in an ordinary irrigation ditch of from 4 to 5 feet in width with a depth of from 2½ to 3 feet and an electrode spacing of from 6 to 8 feet, a voltage of from 30 to 40 volts with current interruption of from 4 to 7 per second is very effective. In larger streams where volume of water and current is stronger and water zones necessarily of greater area and depth, effectiveness is better secured by increasing the voltage up to 80 or 90 volts or even higher under extreme conditions, in which cases the interruptions of the electric current should be reduced to from 2 to 5 per second. This higher voltage is especially required when the smaller fry, which are less susceptible to the current, are to be diverted. It is important that the intermissions between the short periods of current flow be of sufficient duration to allow relaxation in the muscles of the fish, the harder the shock the longer the intermission.

It is important that such electrodes as may be necessary for transmitting the electric currents to the zone of water be so constructed as to permit free passage of floating débris so that the constant flow of water through the zone may not be interrupted to the detrimental operation of my method.

It is evident that different designs and plans may be effectively used for the establishing of the zone of water necessary for the effective operation of my method and while I am herewith showing designs or plans for establishing such zones, I do not wish to be restricted to these particular designs or plans etc. Design and arrangement of establishment of zone will necessarily vary according to the different physical conditions encountered, such as pipe inlets to water systems and irrigation pumping plants, etc.

It is also evident that numerous devices constructed along the lines of well known methods for making and breaking or interrupting electric currents, may be used for the purpose of producing the special necessary form of interruptions required in the proper operation of my method and while I am herewith showing a device for the purpose, it is understood that I am not restricted to this particular construction but may make and use such other device or arrangement as may properly come within the scope and purposes therein set forth.

In Fig. 8 I illustrate in diagram a transformer system of obtaining output currents of different voltages, in which a transformer 115 has its primary 116 connected to the vibrating pendulum 14 and in which the secondary 117 has a lead 118 which may be connected to the electrode 95 of the float or boom 94 as shown in Fig. 7 and the lead 119 connected to the center electrode 97, thus giving the maximum voltage between the float and the central of the submerged electrodes. The tap 120 is connected to the submerged electrode 101, the tap 121 to the electrode 100 and the tap 122 to the electrode 99; thus giving varying voltages between the floated electrode 95 and the submerged electrodes at the bottom of the body of water.

While I have illustrated my invention as being applicable to both A. C. and D. C. current, I prefer to use the direct current as there is less danger of destruction of the fish. I have ascertained that fish may be subjected to direct current over a considerable range of voltage and that apparently the closing of the circuit gives an initial shock and while the current is flowing steadily the fish are not materially inconvenienced, nor are they apparently subject to the influence or shock on the breaking of the current, unless inductance or transformers are incorporated in the circuit and have the effect of generating a discharge impulse on the current break. Therefore with the direct current the shock to the fish appears to be due to the number of interruptions in relation to the time interval and also the extent of the shock depending on the voltage. It is necessary to use a higher voltage to divert or stop small fry than the large fish and for the large fish a much lower voltage is quite effective.

Also as above pointed out, the periods of the current input should be in inverse ratio to the voltage. It is manifest that in rapidly flowing water the electrified zone should be much greater than that in still water to prevent fish being carried past the diverter by the water current. The frequency of the current interruptions is readily varied by shifting the weight 15 on the pendulum 14 and the contacts 45 engaging the block 47 with a brushing or sweeping contact and thus maintain the surfaces clean and within limits the length of time of this contact may be regulated by the springs 44. This may be quite independent of the period between current impulses.

An advantage of the electrodes formed of suspended chains is that these are in effect self-cleaning, so that débris or the like floating in a stream or other body of water does not clog the screen but may float by. It is to be understood that other types of a flexible suspension for the electrodes may be utilized.

Various changes may be made in the principles of my invention without departing from the spirit thereof as set forth in the description, drawings and claims.

I claim:

1. A method of stopping or diverting fish or the like, comprising electrifying a body of water with a current sufficient to slightly shock the fish and subsequently thereto reducing the electrification to give the fish an opportunity to recover from such shock and repeating the electrification causing the shocks and the period of recovery in such a manner as to divert the fish without causing destruction of such fish.

2. A method of stopping or diverting fish or the like comprising electrifying a zone of water through which fish are adapted to pass, by an electric current which produces a shock followed by a period of decreased current to allow the fish to recover or partially recover from such shock, the period of maximum and decreased current being sufficient to produce a condition of physiological tetany in the fish without destruction of such fish.

3. A method of stopping or diverting fish or the like, comprising electrifying a zone of water in which fish are adapted to enter or pass, by pulsations or beats of electric current which current fluctuates between a maximum and a minimum, the current at the maximum being adapted to shock the fish and the period between the maximum currents being sufficient to allow partial recovery of the fish whereby repeated shocks followed by the periods of recovery produce a condition of physiological tetany of the fish without destruction of such fish.

4. A method of stopping or diverting fish or the like, comprising electrifying a zone of water in which fish are adapted to enter or pass, by intermittent pulsations or beats of electric current in which the current rises to a maximum and decreases to a minimum and in which the periods between the maximum are in inverse ratio to the strength of the current, such maximum current and the time between the maximum being adapted to produce a condition of physiological tetany in the fish without destruction of such fish.

5. A method of stopping or diverting fish or the like, comprising electrifying a zone of water between spaced electrodes, whereby the current travels between such electrodes in the general direction of the flow of the water, causing such electrification by pulsation or beats of electric current which rises to a maximum and decreases to a minimum, the maximum current being sufficient to produce a shock in the fish and the periods between the maximum being sufficient to allow partial recovery of the fish and the density of the electrical zone being less at the outer parts thereof than in the central parts of the zone.

6. A method for stopping or diverting fish or other aquatic animals from their directional course of travel by setting up or establishing an electrified zone of water through which is caused to flow intermittent pulsations or beats of electric currents successively followed by periods of intermission of current flow, said electrical currents being of sufficiently high voltage and amperage to divert fish or other aquatic animals from their directional course of travel.

7. A method for stopping or diverting fish or other aquatic animals from their directional course of travel, by setting up or establishing in a body of water, an electrified zone or zones of water consisting of space or spacings between a plurality of electrodes inserted therein, through which are caused to flow intermittent pulsations or beats of electric currents successively followed by periods of intermission of current flow, said electric currents being of sufficiently high voltage and amperage to divert fish or other aquatic animals from their directional course of travel.

8. A method for stopping or diverting fish and other aquatic animals from their directional course of travel, by so electrifying a zone of water in a body of water, as will cause to flow therethrough intermittent pulsations or beats of electric currents successively followed by periods of intermission of current flow, said electric currents being of sufficiently high voltage and amperage to divert the fish and other aquatic animals from their directional course of travel, the frequency of said pulsations or beats to be in inverse ratio to the voltage.

9. A method for stopping or diverting fish and other aquatic animals from their directional course of travel, by so electrifying a zone of water in a body of water, as to cause to flow therethrough intermittent pulsations or beats of electric currents successively followed by periods of intermission of current flow, said intermission periods being of longer duration than the periods of current flow, said electric currents being of sufficiently high voltage and amperage to divert fish and other aquatic animals from their directional course of travel.

10. A method for stopping or diverting fish and other aquatic animals from their directional course of travel, comprising electrifying a zone or zones of water between a plurality of spaced electrodes in a body of water through which is caused to flow in a direction in line with the course of the fish as they enter said zone or zones, intermittent pulsations or beats of electric currents successively followed by periods of intermission of current flow, said electrified zone or zones of water decreasing in electric density towards the side or sides at which the fish enter the zone.

11. A device as described, comprising in combination a source of electric current, means adapted to cause said current to flow between at least two portions of a body of water, creating an electrified zone therein, and means to vary the current whereby the current rises to a maximum and decreases to a minimum, the said maximum current being sufficient to create a condition of physiological tetany in fish or the like and the periods between the maximum currents being sufficient to allow partial recovery of the fish or the like from such condition.

12. A device as described comprising in combination a plurality of electrodes adapted for immersion in a body of water and spaced apart, means to flow an electric current between said electrodes, thereby producing an electrified zone in the body of water, means to vary the current, whereby the current increases to a maximum and decreases to a minimum repeatedly, the said current being sufficient to stop or divert fish or the like and in which the periods between maximum flow of current is in inverse relation to the voltage.

13. In combination a plurality of electrodes adapted to be imposed in a body of water so spaced apart as to form a zone, a current interrupting apparatus by means of which are caused to flow through said zone, from a source of electric energy, intermittent pulsations or beats of electric current of sufficiently high voltage and amperage to divert fish and other aquatic animals from their directional course of travel, said periods of current flow being in inverse ratio to the voltage.

14. In combination a plurality of electrodes adapted to be imposed in a body of water and so spaced apart as to form a zone, a current interrupting apparatus by means of which are caused to flow through said zone from a source of electric energy, intermittent pulsations or beats of electric current of sufficiently high voltage and amperage to divert fish and other aquatic animals from their directional course of travel and in which the periods of intermission of the flow of electric current are of longer duration than the periods of current flow.

15. In combination with a plurality of electrodes adapted to be imposed and spaced apart in a body of water, a current interrupting apparatus by means of which are caused to flow through said electrodes and a zone in the water, from a source of electric energy, intermittent pulsations or beats of electric current of sufficiently high voltage and amperage to divert fish and other aquatic animals from their directional course of travel and in which the periods of intermission of the flow of electric current are of longer duration than the periods of current flow, said periods of current flow being in inverse ratio to the current voltage.

16. In combination with a plurality of electrodes adapted to be imposed and spaced apart in a body of water, a current controlling apparatus by means of which are caused to flow through said electrodes and a zone in said water, from a source of electric energy, a pulsating flow of electric current successively increasing to a maximum and decreasing to a minimum, without complete interruption of the current flow, said current at the maximum flow being of sufficiently high voltage and amperage to divert fish from their directional course of travel.

17. A method of stopping or diverting fish or the like comprising developing pulsations of electric current in a zone of water through which fish are adapted to enter or pass, such pulsations fluctuating between a maximum and a minimum, the current during the maximum period being adapted to shock a fish sufficiently to produce a condition of physiological tetany but insufficient to cause a physiological tetanus, the period between the periods of maximum flow being greater than the period of the maximum flow and sufficient to allow partial recovery of the fish.

18. A method for stopping or diverting fish or the like from their directional course of travel by charging a zone of water through which the fish are adapted to enter or travel with intermittent pulsations of electric current, such pulsations having periods of maximum current flow of comparatively short duration followed by periods of little or no flow of current for a much longer relative period, the maximum flow of current being sufficient to create a condition of physiological tetany in the fish but insufficient to create a condition of physiological tetanus, and the period of little or no flow of current being sufficient for the recovery or partial recovery of the fish from a prior shock.

19. A method for stopping or diverting fish from their directional course of travel by subjecting the fish to intermittent pulsations of electric current, the current being conducted to the fish through the water in which the fish is swimming, the said pulsations being periodic and having a time of maximum current flow and a time of minimum or no flow, the time of maximum flow being much shorter than the time of the minimum or no flow of the current, and the maximum current being sufficient to produce a condition of physiological tetany but insufficient to produce physiological tetanus, and the time of minimum or no flow of current being sufficient for the recovery or partial recovery of the fish from a prior shock.

20. A method for stopping or diverting fish or the like from their directional course of travel, comprising electrifying a zone or zones of water by flowing electric current through such water, such current being in the form of intermittent pulsations, such pulsations being periodic and having a time of maximum flow and of minimum or no flow, the time of maximum flow being materially shorter than the time of the minimum or no flow, and the current strength in voltage or amperage at the maximum being sufficient to produce a condition of physiological tetany but insufficient to produce physiological tetanus, and the time of the minimum or no flow of current being sufficient to allow the recovery or partial recovery of the fish, and the electrification of the zones decreasing in density toward the side or sides at which the fish enter the zone.

21. In a device as described, the combination of a plurality of electrodes spaced apart in a body of water, a current controlling apparatus, electrical connections to charge said electrodes intermittently and periodically, said current controlling apparatus having means to cause a maximum current flow for a relatively short period and a minimum or no flow for a relatively much longer period, and said controlling apparatus being adapted to deliver a current of sufficient maximum strength to cause a condition of physiological tetany but insufficient to produce physiological tetanus in a fish, and said apparatus causing a time of minimum or no current flow of sufficient duration for the recovery or partial recovery of the fish from the previous shock.

22. In a device as described a plurality of electrodes imposed and spaced apart in a body of water, a current controlling device employing an element having an oscillating movement, an electric circuit between said apparatus and the electrodes, means to operate said apparatus to develop a current of maximum flow for a relatively short period and a condition of minimum or no flow for a materially longer period, the said apparatus developing an intermittent current flow and producing a current having a maximum sufficient to produce a condition of physiological tetany in a fish but insufficient to produce physiological tetanus, and said apparatus causing the period of minimum or no flow to be of sufficient duration for the recovery or partial recovery of the fish.

23. In a device as described, an elongated float having an electrode thereon, the electrode being submerged adjacent the surface of a body of water, a plurality of elongated electrodes at the bottom of the body of water, the electrodes at the bottom being parallel to the floating electrode, one of the electrodes at the bottom being closest to the floating electrode and the others positioned at opposite sides of this closest electrode.

24. In a device as described in claim 23, electrical circuits to the electrodes at the bottom having varying resistances whereby the electrode which is closest to the floating electrode has the least resistance, and the resistance of the other electrodes being graduated whereby the electrode most remote from the floating electrode has the greatest resistance whereby there is the least current flow between the most remote electrode and the floating electrode and the greatest flow of current between the nearest electrode and the floating electrode.

25. A method of stopping or diverting fish or the like comprising developing pulsations of electric current in a zone of water through which fish are adapted to enter or pass, such pulsations fluctuating between a maximum and a minimum, the current during the maximum period being adapted to shock a fish but insufficient to cause a physiological tetanus, the period between the periods of maximum flow being greater than the period of the maximum flow and sufficient to allow partial recovery of the fish.

26. A method for stopping or diverting fish or the like from their directional course of travel by charging a zone of water through which the fish are adapted to enter or travel with intermittent pulsations of electric current, such pulsations having periods of maximum current flow of comparatively short duration followed by periods of little or no flow of current for a much longer relative period, the flow of current being insufficient to create a condition of physiological tetanus, and the period of little or no flow of current being sufficient for the recovery or partial recovery of the fish from a prior shock.

27. A method for stopping or diverting fish from their directional course of travel by subjecting the fish to intermittent pulsatic s of electric current, the current being conducted to the fish through the water in which the fish is swimming, the said pulsations being periodic and having a time of maximum current flow and a time of minimum or no flow, the time of maximum flow being much shorter than the time of the minimum or no flow of the current, and the maximum current being insufficient to produce physiological tetanus, and the time of minimum or no flow of current being sufficient for the recovery or partial recovery of the fish from a prior shock.

28. In a device as described, the combination of a plurality of electrodes spaced apart in a body of water, a current controlling apparatus, electrical connections to charge said electrodes intermittently and periodically, said current controlling apparatus having means to cause a maximum current flow for a relatively short period and a minimum or no flow for a relatively much longer period, and said controlling apparatus being adapted to deliver a current of sufficient maximum strength to cause a shock but insufficient to produce physiological tetanus in a fish, and said apparatus causing a time of minimum or no current flow of sufficient duration for the recovery or partial recovery of the fish from the previous shock.

29. The method of stopping fish from swimming through a run, that includes subjecting the water in said run to periodically interrupted alternating current flow at a potential gradient sufficient to stop but not to injure the fish.

30. In combination with a fish run having electrodes therein, a source of alternating current connected to said electrodes, and a current interrupter for interrupting the current energizing said electrodes.

HENRY T. BURKEY.